(12) United States Patent
Albero et al.

(10) Patent No.: US 12,380,189 B2
(45) Date of Patent: Aug. 5, 2025

(54) FINGERPRINT AUTHENTICATION-RELATED INDICATORS FOR CONTROLLING DEVICE ACCESS AND/OR FUNCTIONALITY

(71) Applicant: BANK OF AMERICA CORPORATION, Charlotte, NC (US)

(72) Inventors: George Anthony Albero, Charlotte, NC (US); Dustin Paul Stocks, Stallings, NC (US); Edward Lee Traywick, Bellbrook, OH (US); Jake Michael Yara, Mint Hill, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 480 days.

(21) Appl. No.: 17/736,696

(22) Filed: May 4, 2022

(65) Prior Publication Data
US 2023/0359716 A1    Nov. 9, 2023

(51) Int. Cl.
*G06F 21/32* (2013.01)
*G06F 3/041* (2006.01)
*G06F 21/31* (2013.01)
*G06F 21/44* (2013.01)
*G06F 21/62* (2013.01)
*G06V 40/12* (2022.01)
*G06V 40/13* (2022.01)
*G06V 40/16* (2022.01)
*G06V 40/20* (2022.01)

(52) U.S. Cl.
CPC ............ *G06F 21/32* (2013.01); *G06F 3/0412* (2013.01); *G06F 21/316* (2013.01); *G06F 21/44* (2013.01); *G06F 21/629* (2013.01); *G06V 40/1306* (2022.01); *G06V 40/1365* (2022.01); *G06V 40/174* (2022.01); *G06V 40/20* (2022.01); *G06F 2203/04105* (2013.01); *G06F 2221/2139* (2013.01)

(58) Field of Classification Search
CPC ...... G06F 21/32; G06F 3/0412; G06F 21/316; G06F 21/44; G06F 21/629; G06F 2203/04105; G06F 2221/2139; G06V 40/1306; G06V 40/1365; G06V 40/174; G06V 40/20
See application file for complete search history.

(56) References Cited

U.S. PATENT DOCUMENTS 7,172,115 B2   2/2007  Lauden
7,430,306 B1   9/2008  Osborn et al.
(Continued)

*Primary Examiner* — Abhishek Sarma
(74) *Attorney, Agent, or Firm* — Moore & Van Allen PLLC; Anup Iyer

(57) ABSTRACT

A security feature within an apparatus that includes a fingerprint scanner used for purposes of authentication. Specifically, a first indicator is detected that is a user input to a fingerprint scanner and indicates the occurrence of a duress-inducing event. In response to detecting the first indicator, (i) access to the apparatus is controlled, and (ii) access to functionality provided by the apparatus is controlled. As such, if the user is being forced to input their fingerprint by a nefarious entity desiring access to the apparatus, the present invention provides a means by which the user can covertly activate certain features on the apparatus that prevent the nefarious entity from access to the apparatus and/or functionality provided by the apparatus.

19 Claims, 3 Drawing Sheets

(56) References Cited

U.S. PATENT DOCUMENTS

| | | | |
|---|---|---|---|
| 8,352,730 B2 | 1/2013 | Giobbi | |
| 8,694,793 B2 | 4/2014 | Evans | |
| 8,952,781 B2 | 2/2015 | Al-Azem et al. | |
| 9,053,310 B2 | 6/2015 | Oberheide et al. | |
| 9,218,474 B1 * | 12/2015 | Roth | G06F 21/32 |
| 10,171,460 B2 | 1/2019 | Giobbi | |
| 10,943,470 B2 | 3/2021 | Lee et al. | |
| 11,132,882 B1 | 7/2021 | Giobbi | |
| 11,546,325 B2 | 1/2023 | Giobbi | |
| 2007/0241861 A1 | 10/2007 | Venkatanna et al. | |
| 2009/0145972 A1 | 6/2009 | Evans | |
| 2015/0015365 A1 | 1/2015 | Ortiz et al. | |
| 2017/0230363 A1 | 8/2017 | Deutschmann et al. | |
| 2018/0204080 A1 | 7/2018 | Thieme et al. | |
| 2018/0293368 A1 * | 10/2018 | Davis | G06F 21/31 |
| 2019/0065714 A1 * | 2/2019 | Adams | G06F 21/32 |
| 2020/0358760 A1 | 11/2020 | Krishan | |
| 2021/0210178 A1 | 7/2021 | Giobbi et al. | |
| 2021/0383401 A1 | 12/2021 | Giobbi | |
| 2022/0335435 A1 | 10/2022 | Giobbi et al. | |

* cited by examiner

FINGERPRINT AUTHENTICATION-RELATED INDICATORS FOR CONTROLLING DEVICE ACCESS AND/OR FUNCTIONALITY

FIELD OF THE INVENTION

The present invention is related to device security and, more specifically providing security measures in devices in which a fingerprint scanner is used as a means for user authentication.

BACKGROUND

In specific devices, such as mobile communication devices, fingerprint-enabled door locks, fingerprint locks and the like, a fingerprint may be used as the mechanism for authentication. In such devices a user's fingerprint feature data set is stored in memory and, subsequently, when a user desires to be authenticated and enters their fingerprint via a fingerprint sensor, the entered fingerprint is compared to the fingerprint feature data set to verify that a match exists between the entered fingerprint and the fingerprint feature data set.

However, a nefarious entity may seek to gain access to the mobile communication device or unlock the fingerprint-enabled door or lock by coercing the user into providing their fingerprint.

Therefore, a need exists to develop systems, methods and the like that would prevent a nefarious entity from gaining accessing to a mobile communication device (or functionality provided by a mobile communication device) or unlocking a fingerprint-enabled door or a stand-alone fingerprint lock in those instances in which a nefarious entity coerces a user to present their fingerprint.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by provide a security feature for apparatus that employ a fingerprint scanner as a means for user authentication. Specifically, the invention provides for detection, at a fingerprint scanner, of a first indicator that indicates a duress-inducing event. In response to detecting the first indicator, control at least one of (i) access to the apparatus, and (ii) access to functionality provided by the apparatus.

In specific embodiments of the invention, the first indicator is the user applying an amount of pressure at the fingerprint scanner in excess of a predetermined pressure amount threshold. In other embodiments of the invention, the first indicator is the user applying a pattern of movement of one or more fingers at the fingerprint scanner that meets a predetermined movement pattern. In still further specific embodiments of the invention, the first indicator is determining that a match exists between the scanned fingerprint of the user and a stored duress fingerprint feature data set (i.e., a fingerprint feature data set of another user fingerprint other than the fingerprint feature data set used for purposes of authentication).

In specific embodiments of the invention, controlling access to the apparatus occurs by (i) powering down the apparatus, (ii) moving the apparatus to a locked state, (iii) preventing the apparatus from moving to an unlocked state, or (iv) requiring the user to submit further authentication credentials to move the apparatus to an unlocked state. In other embodiments of the invention, in which the apparatus is a mobile communication device, controlling access to functionality provided by the apparatus occurs by (i) closing specific applications, (ii) preventing access to specific applications, (iii) removing or preventing access to user data stored or accessible from specific applications, (iv) requiring the user to submit further authentication credentials to access the specific applications and/or (v) presenting alternative user interface(s) on a display of the apparatus that display icons for one or more inaccessible mock applications.

In additional embodiments of the invention, in response to detecting the first indicator, the apparatus is configured to generate and initiate wireless communication of an alert to financial institution(s) associated with the user, and/or a public safety entity. In other embodiments of the invention, in response to detecting the first indicator, the apparatus is configured to activate one or more audio and/or video recording devices to capture audio and/or video of the surroundings.

Additionally, in other embodiments of the invention, the apparatus is configured to detect a second indicator, such as (i) an audible code spoken by the user, or (ii) a body or facial gesture performed by the user, which indicates that the user is experiencing the duress-inducing event, and, in response to detecting the second indicator take further actions to alleviate the duress-inducing event, and/or aid in analyzing the duress-inducting event.

An apparatus for access and/or functionality security defines first embodiments of the invention. The apparatus includes a computing platform having a memory that stores an authentication fingerprint feature data set of a user and one or more computing processor devices in communication with the memory. The computing platform additionally includes a fingerprint scanner that is in communication with at least one of the one or more computing processor devices.

In addition, the computing platform includes a fingerprint indicator detection and response application that is stored in the memory and executable by at least one of the one or more computing processor devices. The fingerprint indicator detection and response application is configured to, while the fingerprint scanner is scanning the fingerprint of a user, detect, at the fingerprint scanner, a first indicator that is prompted by the user experiencing a duress-inducing event. In response to detecting the first indicator, the fingerprint indicator detection and response application is further configured to control at least one of (i) access to the apparatus, and (ii) access to functionality provided by the apparatus.

In specific embodiments of the apparatus, the fingerprint scanner is configured to sense an amount of pressure applied by the user while scanning the fingerprint. In such embodiments of the apparatus, detecting the first indicator is the user applying an amount of pressure at the fingerprint scanner in excess of a predetermined pressure amount threshold.

In other specific embodiments of the apparatus, the memory further stores a duress fingerprint feature data set (i.e., a different finger that the finger used for the authentication feature data set). In such embodiments detecting the first indicator is determining a match between a scanned fingerprint of the user and the duress fingerprint feature data set.

In still further specific embodiments of the apparatus, detecting the first indicator is determining that the user is applying a pattern of movement of one or more fingers at the fingerprint scanner that meets a predetermined movement pattern.

In additional specific embodiments of the apparatus, the fingerprint indicator detection and response application is further configured to control access to the apparatus by performing one of (i) powering down the apparatus, (ii) moving the apparatus to a locked state, (iii) preventing the apparatus from moving to an unlocked state, or (iv) requiring the user to submit further authentication credentials to move the apparatus to an unlocked state.

In still further specific embodiments, the apparatus comprises a mobile communication device and the memory further stores one or more applications that store or provide access to user data. In such embodiments of the apparatus, the fingerprint indicator detection and response application is further configured to control access to functionality provided by the apparatus by performing one of (i) closing the applications, (ii) preventing access to the applications, (iii) removing or preventing access to the user data, or (iv) requiring the user to submit further authentication credentials to access the applications or the user data. In related embodiments of the apparatus, the fingerprint indicator detection and response application is further configured to control access to functionality provided by the mobile communication device by presenting one or more alternative user interfaces on a display of the apparatus. The alternative user interfaces display icons for one or more inaccessible mock applications.

In still further specific embodiments of the apparatus, the fingerprint indicator detection and response application is further configured to generate and initiate wireless communication of an alert to one or more of (i) one or more financial institutions associated with the user, and (ii) a public safety entity.

Moreover, in other embodiments of the apparatus, the computing platform further comprises one or more audio and/or video recording devices that are in communication with at least one of the one or more computing device processors. In such embodiments of the apparatus, the fingerprint indicator detection and response application is further configured to in response to detecting the first indicator, activate at least one of the one or more audio and/or video recording devices to capture audio and/or video. In related embodiments of the apparatus, the computing platform further comprises one or more audio and/or video recording devices that are in communication with at least one of the one or more computing device processors and the apparatus further includes an audio and/or video indicator detection and response application stored in the memory, executable by at least one of the one or more computing device processors and configured to detect a second indicator that is prompted by the user experiencing the duress-inducing event. The second indicator includes one of (i) an audible code spoken by the user, or (ii) a body or facial gesture performed by the user.

A computer-implemented method for computing apparatus access and/or functionality security defines second embodiment of the invention. The computer-implemented method is executed by one or more computing processor devices. The method includes, while a fingerprint scanner disposed on a computing apparatus is scanning a fingerprint of a user, detect, at the fingerprint scanner, a first indicator that is prompted by the user experiencing a duress-inducing event, and, in response to detecting the first indicator, controlling at least one of (i) access to the apparatus, and (ii) access to functionality provided by the apparatus.

In specific embodiments of the method, detecting the first indicator further comprises determining that the user is applying an amount of pressure at the fingerprint scanner in excess of a predetermined pressure amount threshold. In related specific embodiments of the method, detecting the first indicator further comprises determining a match between a scanned fingerprint of the user and a stored duress fingerprint feature data set. On still further related specific embodiments of the method, detecting the first indicator further comprises determining that the user applying a pattern of movement of one or more fingers at the fingerprint scanner that meets a predetermined movement pattern.

In further specific embodiments of the method, controlling access to the apparatus further comprises one of (i) powering down the apparatus, (ii) moving the apparatus to a locked state, (iii) preventing the apparatus from moving to an unlocked state, or (iv) requiring the user to submit further authentication credentials to move the apparatus to an unlocked state.

In other specific embodiments of the method, controlling access to functionality provided by the apparatus further comprises one of (i) closing applications stored on or accessible to the computing apparatus, (ii) preventing access to the applications, (iii) removing or preventing access to user data stored within or accessible to the applications, or (iv) requiring the user to submit further authentication credentials to access the applications or the user data.

A computer program product including a non-transitory computer-readable medium having sets of codes defines third embodiments of the invention. The sets of codes cause one or more computing processing devices to, while a fingerprint scanner disposed on a computing apparatus is scanning a fingerprint of a user, detect, at the fingerprint scanner, a first indicator that is prompted by the user experiencing a duress-inducing event. Further, the sets of codes cause the one or more computing processing devices to, in response to detecting the first indicator, controlling at least one of (i) access to the apparatus, and (ii) access to functionality provided by the apparatus.

In specific embodiments of the computer program product, the set of codes for causing the computing processing device(s) to detect the first indicator further comprise codes for causing the one or more computing processor devices to (i) determine that the user is applying an amount of pressure at the fingerprint scanner in excess of a predetermined pressure amount threshold, (ii) determine that the user is applying an a pattern of movement of one or more fingers at the fingerprint scanner that meets a predetermined movement pattern, or (iii) determining a match between a scanned fingerprint of the user and a duress fingerprint feature data set.

In other specific embodiments of the computer program product, the set of codes for causing the one or more computing processing devices to control access to the apparatus further comprise codes for causing the one or more computing processor devices to (i) power down the apparatus, (ii) move the apparatus to a locked state, (iii) prevent the apparatus from moving to an unlocked state, or (iv) require the user to submit further authentication credentials to move the apparatus to an unlocked state.

Moreover, in additional specific embodiments of the computer program product, the set of codes for causing the one or more computing processing devices to control access to functionality provided by the apparatus further comprise codes for causing the one or more computing processor devices to one of (i) close applications stored on or accessible to the computing apparatus, (ii) prevent access to the applications, (iii) remove or preventing access to user data stored within or accessible to the applications, or (iv) require the user to submit further authentication credentials to access the applications or the user data.

Thus, according to embodiments of the invention, which will be discussed in greater detail below, the present invention provides for a security feature within an apparatus that includes a fingerprint scanner used for purposes of authentication. Specifically, the invention detects a first indicator that is a user input to a fingerprint scanner and indicates the occurrence of a duress-inducing event. In response to detecting the first indicator, the present invention controls at least one of (i) access to the apparatus, and (ii) access to functionality provided by the apparatus. As such, if the user is being forced to input their fingerprint by a nefarious entity desiring access to the apparatus, the present invention provides a means by which the user can covertly activate certain features on the apparatus that prevent the nefarious entity from access to the apparatus and/or functionality provided by the apparatus.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
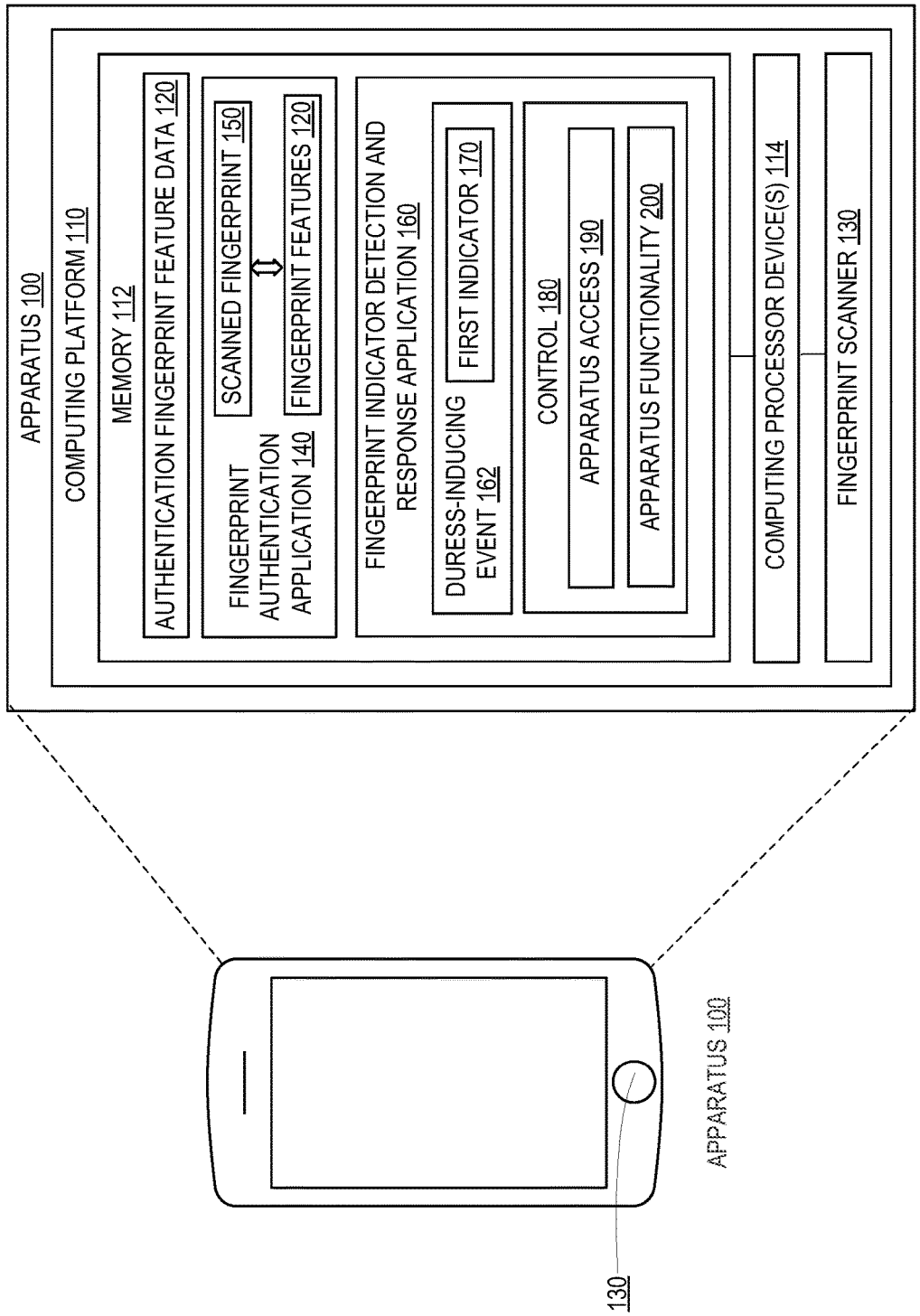
Figure 2:
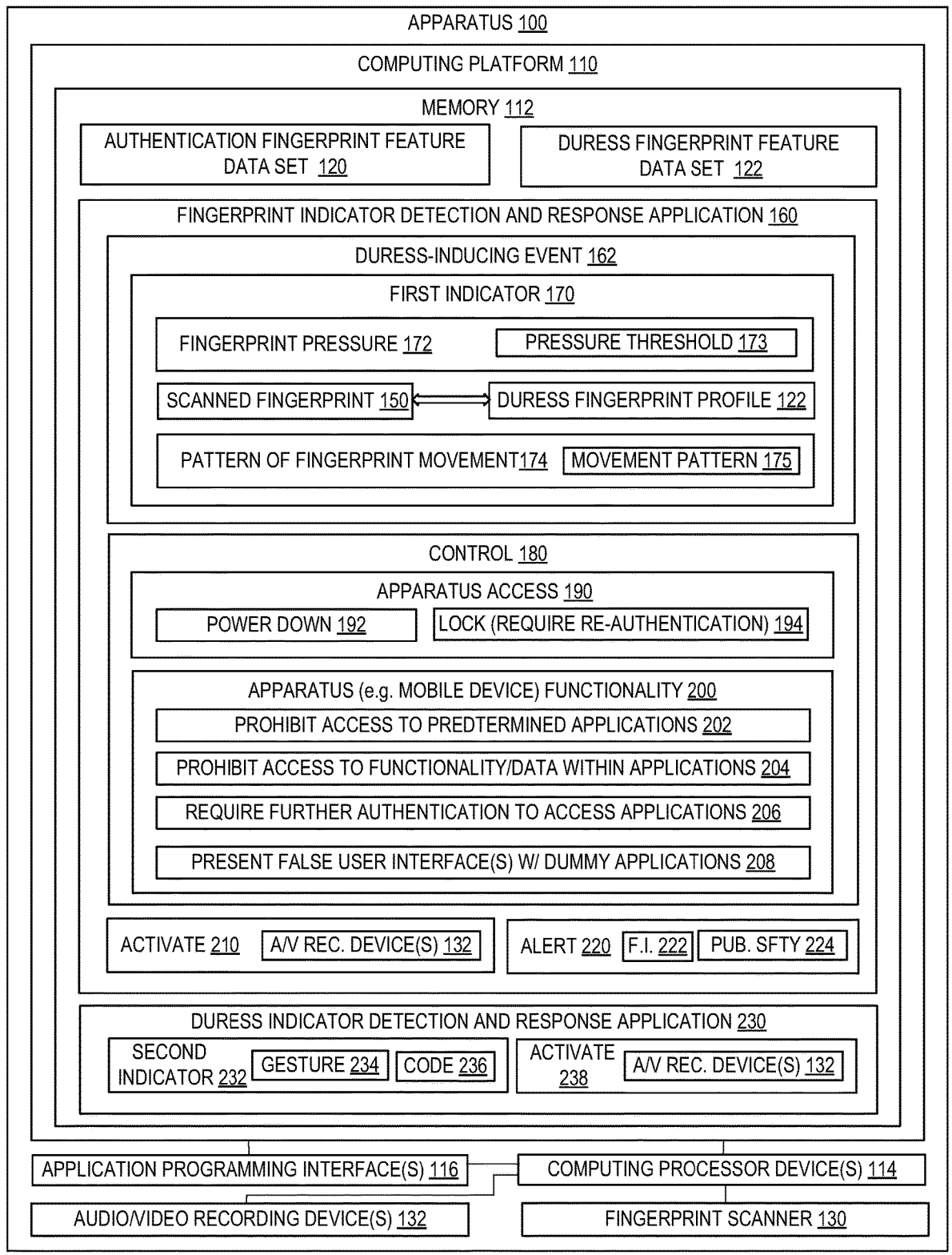
Figure 3:
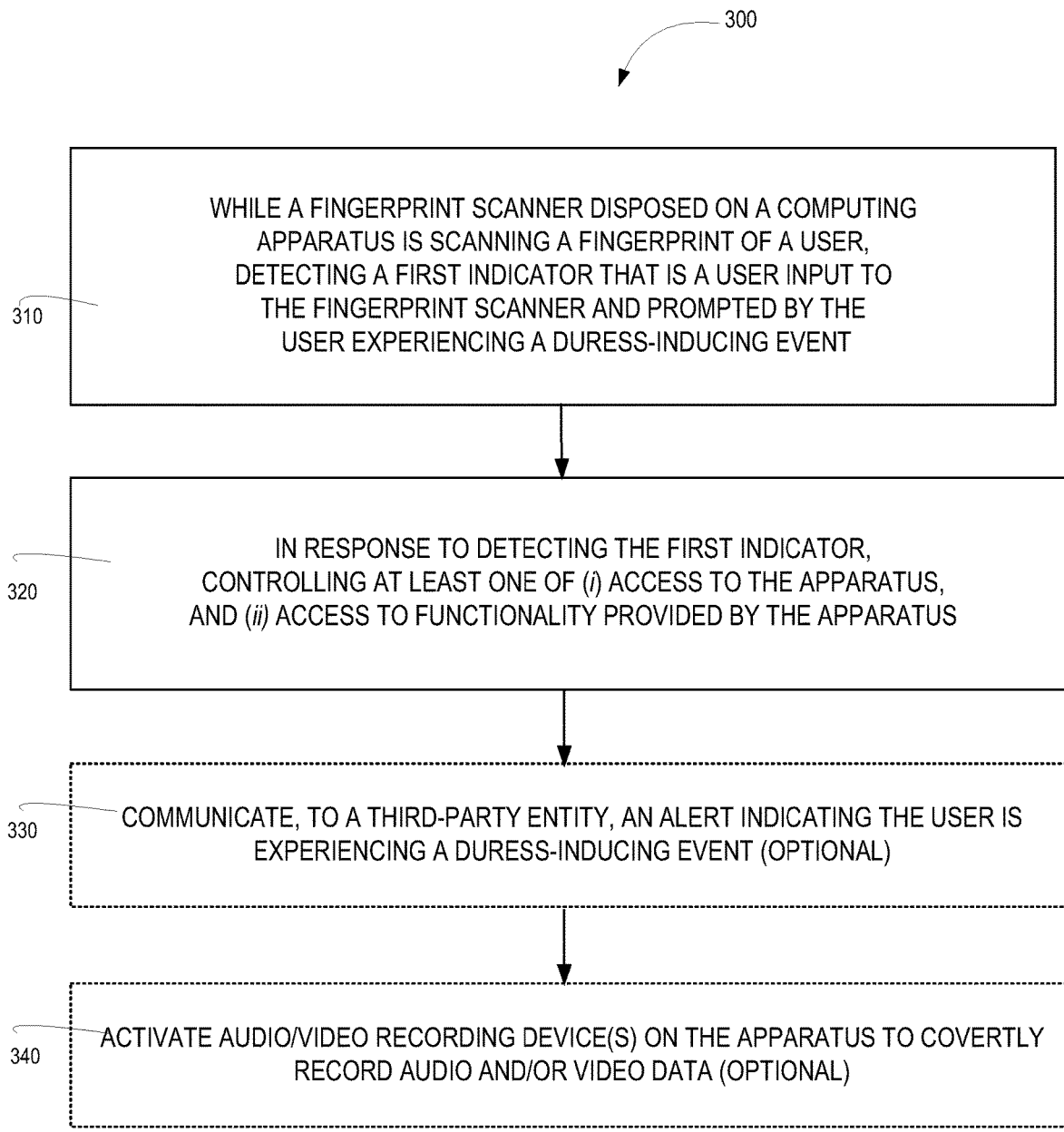

Having thus described embodiments of the disclosure in general terms, reference will now be made to the accompanying drawings, wherein:

FIG. 1 is a schematic/block diagram of an apparatus that implements a fingerprint scanner for authentication purposes, which is configured with security features, in accordance with some embodiments of the present disclosure;

FIG. 2 is a block diagram of the apparatus shown in FIG. 1 and highlighting additional features and embodiments, in accordance with some embodiments of the present disclosure; and FIG. 3 is a flow diagram of a method for providing security features in an apparatus that implements a fingerprint scanner for authentication purposes, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide a security feature to apparatus that includes a fingerprint scanner for purposes of user authentication. Specifically, the invention detects a first indicator that is a user input to a fingerprint scanner and indicates a duress-inducing event. In response to detecting the first indicator, the present invention controls at least one of (i) access to the apparatus, and (ii) access to functionality provided by the apparatus. The apparatus may be a mobile communication device, a lock system that implements fingerprint scanning for user authentication (i.e., unlocking or locking the lock) or any other apparatus that uses a fingerprint scanner for user authentication purposes.

In specific embodiments of the invention, the first indicator is the user applying an amount of pressure at the fingerprint scanner in excess of a predetermined pressure amount threshold. In other embodiments of the invention, the first indicator is the user applying a pattern of movement of one or more fingers at the fingerprint scanner that meets a predetermined movement pattern. In still further specific embodiments of the invention, the first indicator is determining that a match exists between the scanned fingerprint of the user and a stored duress fingerprint feature data set (i.e., a fingerprint feature data set of another user fingerprint other than the fingerprint feature data set used for purposes of authentication).

In specific embodiments of the invention, controlling access to the apparatus occurs by (i) powering down the apparatus, (ii) moving the apparatus to a locked state, (iii) preventing the apparatus from moving to an unlocked state, or (iv) requiring the user to submit further authentication credentials to move the apparatus to an unlocked state.

In other embodiments of the invention, in which the apparatus is a mobile communication device, controlling access to functionality provided by the apparatus occurs by (i) closing specific applications, (ii) preventing access to specific applications, (iii) removing or preventing access to user data stored or accessible from specific applications, (iv) requiring the user to submit further authentication credentials to access the specific applications and/or (v) presenting alternative user interface(s) on a display of the apparatus that display icons for one or more inaccessible mock applications.

In additional embodiments of the invention, in response to detecting the first indicator, the apparatus is configured to generate and initiate wireless communication of an alert to financial institution(s) associated with the user, and/or a public safety entity. In other embodiments of the invention, in response to detecting the first indicator, the apparatus is configured to activate one or more audio and/or video recording devices to capture audio and/or video of the surroundings.

Additionally, in other embodiments of the invention, the apparatus is configured to detect a second indicator, such as (i) an audible code spoken by the user, or (ii) a body or facial gesture performed by the user, which indicates that the user is experiencing the duress-inducing event, and, in response to detecting the second indicator take further actions to alleviate the duress-inducing event, and/or aid in analyzing the duress-inducting event.

Turning now to the figures, FIG. 1 a schematic/block diagram is provided of an apparatus 100 that includes a fingerprint scanner 130, in accordance with embodiments of the present invention. In the illustrated embodiment of FIG. 1 apparatus 100 is a mobile communication device; however, the apparatus may include any apparatus that uses a fingerprint scanner for purposes of user authentication, such as, but not limited to, a lock device/system or the like.

The apparatus 100 includes a computing platform 110 having a memory 112 and one or more computing processor devices 114 in communication with the memory 112. The apparatus additionally includes a fingerprint scanner 130 that is in communication with at least one of the computing processor devices 114. In conventional use, fingerprint authentication application 140 requires a user to implement the fingerprint scanner 130 to create an authentication fingerprint feature data set 120 which is stored in memory 112 or otherwise accessible via network communication. Subsequently, when the user scans their fingerprint using the fingerprint scanner 130, the scanned fingerprint 150 is compared to the authentication fingerprint feature data set 120 and if a match is determined, the user is deemed to be authenticated (i.e., allowed to access the apparatus 100 and/or features provided by the apparatus 100).

In accordance with embodiments of the present invention, memory 112 of apparatus 100 stores fingerprint indicator detection and response application 160 that is configured to detect a first indicator 170 that is a user input at the fingerprint scanner 130 and prompted by the user experiencing a duress-inducing event 162. For example, the user may be being forced to scan their fingerprint by a nefarious party desiring access to the user's apparatus or access to functionality provided by the apparatus 100 (i.e., access to a user's mobile communication device and/or specific applications stored thereon, unlocking a lock to provide access to a building or contents therein or the like). Specific examples of first indicators are provided in relation to FIG. 2, infra.

In response to detecting the first indicator 170, fingerprint indicator detection and response application 160 is configured to control 180 at least one of (i) access 190 to the apparatus 100 and/or (ii) access to functionality 200 provided by the apparatus 100. Specific examples of controlling 180 (i) access 190 to the apparatus 100 and (ii) access to functionality 200 provided by the apparatus 100 are provided in relation to FIG. 2, infra.

Referring to FIG. 2, a block diagram is presented of apparatus 100 configured for access and/or functionality security, in accordance with embodiments of the present invention. In addition to providing greater details of the apparatus 100, of FIG. 2 highlights various alternate embodiments of the invention. The apparatus 100 may comprise one or multiple devices that are in wired and/or wireless communication with one another. Apparatus 100 includes a computing platform 110 having memory 102, which may comprise volatile and non-volatile memory, such as read-only and/or random-access memory (RAM and ROM), EPROM, EEPROM, flash cards, or any memory common to computing platforms). Moreover, memory 112 may comprise cloud storage, such as provided by a cloud storage service and/or a cloud connection service.

Further, apparatus 100 also includes one or more computing processor devices 114, which may be an application-specific integrated circuit ("ASIC"), or other chipset, logic circuit, or other data processing device. Computing processor device(s) 114 may execute one or more application programming interface (APIs) 116 that interface with any resident programs, such as fingerprint indicator detection and response application 160 or the like, stored in memory 112 of apparatus 100 and any external programs. Computing processor devices(s) 114 may include various processing subsystems (not shown in FIG. 2) embodied in hardware, firmware, software, and combinations thereof, that enable the functionality of apparatus 100 and the operability of apparatus 100 on a network, such as the Intranet, cellular network(s) and the like. For example, processing subsystems allow for initiating and maintaining communications and exchanging data with other networked devices. For the disclosed aspects, processing subsystems of apparatus 100 may include any subsystem used in conjunction with fingerprint indicator detection and response application 160 and related tools, routines, sub-routines, algorithms, sub-algorithms, sub-modules thereof.

Additionally, apparatus 100 includes fingerprint scanner 130 that is in communication with at computing processor device 114 and, in some embodiments of the invention, memory 112. In specific embodiments of the invention, which will be discussed infra., apparatus 100 additionally includes one or more audio/video recording devices 112, such as a camera, an audio recorder or the like.

In specific embodiments of the present invention, apparatus 100 may additionally include a communications module (not shown in FIG. 2) embodied in hardware, firmware, software, and combinations thereof, that enables electronic communications between the apparatus 100 and other networks and network devices. Thus, communication module may include the requisite hardware, firmware, software and/or combinations thereof for establishing and maintaining a network communication connection with one or more devices and/or networks.

Memory 112 of apparatus 100 stores fingerprint indicator detection and response application 160 that is configured to detect a first indicator 170 that is a user input at the fingerprint scanner 130 and prompted by the user experiencing a duress-inducing event 162. In specific embodiments of the invention, detecting a first indicator 170 includes detecting that fingerprint pressure 172 applied to the fingerprint scanner 130 is in excess of a predetermined pressure threshold 173. In other words, the user is intentionally applying a greater amount of pressure at the fingerprint scanner 130 so as to indicating that the user is experiencing a duress-inducing event 162. In other specific embodiments of the invention, detecting a first indicator 170 includes detecting a pattern of fingerprint movement that matches a predetermined movement pattern 175. For example, the predetermined movement pattern may be a circular motion, an up and down or back and forth motion on the fingerprint scanner 130, such that a user providing such a motion at the fingerprint scanner 130 indicates that the user is experiencing a duress-inducing event 162.

In other specific embodiments of the invention, detecting a first indicator includes detecting that the scanned fingerprint 150 matches a duress fingerprint feature data set 162 that is stored in memory 112 or otherwise network-accessible. The duress fingerprint feature data set 162 will have been previously created by the user using a different finger or fingers than the finger(s) used to create the authentication fingerprint feature data set 120.

In response to detecting the first indicator 170, fingerprint indicator detection and response application 160 is configured to control 180 at least one of (i) access 190 to the apparatus 100 and/or (ii) access to functionality 200 provided by the apparatus 100. Control 180 of apparatus access 190 includes (i) powering down/shutting off 192 the apparatus 100 and/or (ii) locking 194 the apparatus 100 (i.e., requiring the user to re-authenticate). In those embodiments of the invention, in which the apparatus 100 is a mobile communication device or the like, control of apparatus functionality 200 includes (i) prohibiting access to predetermined applications, (ii) prohibiting access to predetermined functionality and/or data within predetermined applications, and/or (iii) requiring further authentication credentials to access predetermined applications. The predetermined applications and/or predetermined functionality/data may be preset by the application or the user may configure/select which applications and/or functions/data are to be controlled. In specific examples, the applications may be financial applications or applications that allow the user to conduct financial transactions, the functions may be financial transactions, such as purchase transactions, withdrawals, transfers and the like, and the data may be any personal data of the user, including, but not limited to, name, addresses, telephone numbers, account numbers and the like.

In additional embodiments of the invention in which the apparatus 100 is a mobile communication device or the like, control of apparatus functionality 200 includes presenting one or more false/fake user interfaces 208, such as a home page screen that includes icons for mock applications that appear as though the are real but are otherwise inaccessible.

In additional embodiments of the invention, in response to detecting the first indicator 170, fingerprint indicator detection and response application 160 is configured to generate and initiate wireless communication of an alert 220 that indicates that the user is experiencing a duress-inducing event 162. The alert 220 may be communicated to one or more financial institutions 222 or a public safety entity 224 so that the financial institution(s) 222 and/or public safety entity 224 can take appropriate action to mitigate the duress-inducing event 162 (e.g., lock accounts, prohibit transactions, send a public safety entity representative to the site and the like).

In other embodiments of the invention, in response to detecting the first indicator 170, fingerprint indicator detection and response application 160 is configured to activate 210 one or more of the audio/video recording devices 132 to initiate covert recording of audio and/or video of the surrounding area. Covert recording occurs without any visual or audio indication provided by the apparatus that such recording is occurring.

In other embodiments of the invention, memory 230 stores a duress indicator detection and response application 230 that is configured to receive a second indicator 232 that is prompted by a user confirming that they are experiencing the stress-inducing event 160. Thus, the receipt of the first indicator 170 precedes the receipt of the second indicator 232. In specific embodiments of the invention, second indicator 232 is received by capturing video data and determining that the video data includes a predetermined user gesture 234, such as facial gesture or a body gesture. In such embodiments of the invention, an audio/video recording device 132 is in a so-called "viewing" mode in which the audio/video recording device 132 is activated 238 (so-called "wakes-up") in response to viewing a specific predetermined image (in this instance, the predetermined gesture 234). In other specific embodiments of the invention, second indicator 232 is received by capturing audio data and determining that the audio data includes a predetermined audible code 236, such as a word, phrase, utterance or the like. In such embodiments of the invention, the audio/video recording device 132 is in a so-called "listening" mode in which the audio/video recording device 132 is activated 238 (so-called "wakes-up") in response to hearing specific predetermined audio (in this instance, the predetermined audible code 236). In such embodiments of the invention, the user may pre-select/choose the predetermined gesture 234 or audible code 238.

In other embodiments of the invention, second indicator 232 is received by receiving a predetermined input to the apparatus 100. In specific embodiments receiving the predetermined input includes detecting a predetermined movement 136 of the apparatus 100, such as a predetermined movement pattern (e.g., rapid shaking of the apparatus 100) or a predetermined amount of movement as detected by one or more motion-sensing devices (not shown in FIG. 2) included within the computing platform 112 of apparatus 100. In other specific embodiments receiving the predetermined input includes detecting a predetermined user input to a touch display (not shown in FIG. 2) of apparatus 100, such as, rapid tapping of the touch display of specified amount or a swiping motion across the touch display. In such embodiments of the invention, the user may choose the predetermined movement/motion or predetermined user input made to the touch display.

In response to detecting the second indicator 232, duress indicator detection and response application 230 is configured to (a) control 180 (i) access 190 to the apparatus 100, and/or (ii) access to functionality 200 provided by the apparatus 100, (b) generate and initiate communication of an alert 220 to a financial institution(s) and/or public safety entity that indicates the occurrence of the duress-inducing event, and/or (c) activate 210 one or more audio/video recording devices 132 on the apparatus 100. In this regard, second indicator 232 prompts a preventive or cautionary event other than an event conducted in response to detecting the first indicator 170.

Referring to FIG. 3, a flow diagram is presented of a method 300 for apparatus security, in accordance with embodiments of the present invention. At Event 310, while a fingerprint scanner disposed on an apparatus is scanning a fingerprint of a user, a first indicator is received as a user input to the fingerprint scanner. The first indicator indicates that the user is experiencing a duress-inducing event. In specific embodiments of the method, the first indicator is an amount of pressure applied to the fingerprint scanner is excess of a predetermined pressure amount. In other embodiments of the method, the first indicator is a pattern of movement by the finger(s) at the fingerprint scanner that matches a predetermined fingerprint movement pattern. In still further embodiments of the method, the first indicator is the scanned fingerprint matching a predetermined duress fingerprint feature data set (i.e., a fingerprint of another finger(s) other than the fingerprint used to create the authentication fingerprint).

In response to detecting/receiving the first indicator, at Event 320, either access to the apparatus is controlled or access to functionality proved by the apparatus is controlled. Controlling access to the apparatus may include powering down/shutting off the apparatus or locking the apparatus (i.e., requiring further authentication credentials, other than a fingerprint, to access the3 apparatus). Controlling access to functionality provided by the apparatus may include prohibiting access to predetermined applications and/or predetermined functionality and/or data provided by the applications, and/or requiring further authentication credentials to access the predetermined applications and/or predetermined functionality and/or data provided by the applications. In further embodiments of the method, controlling access to functionality provided by the apparatus may include presenting a false/fake UI/home page screen that includes icons for mock applications that appear as though they are real but are otherwise inaccessible.

In optional embodiments of the method, at Event 330, an alert is communicated to a third-party entity, e.g., financial institution, public safety/law enforcement agency or the like, that indicates that the user is experiencing a duress-inducing event. In specific embodiments of the method, the communication of the alert is prompted by receiving/detecting the first indicator, while in other embodiments of the invention the alert is communicated in response to receiving/detecting a second indicator, such as a predetermined user body and/or facial gesture, a predetermined audible code and/or a predetermined input to the apparatus.

In optional embodiments of the method, at Event 330, one or more audio/video recording devices disposed in or in communication with the apparatus are activated to covertly record audio and/or video data of the surrounding area. Covert recording means that no visual or audible signal is provide on the apparatus or the recording apparatus that indicates that recording is occurring. In specific embodiments of the method, activation of the audio/video recording devices is prompted by receiving/detecting the first indicator, while in other embodiments of the invention the activation of the audio/video recording devices is in response to a receiving/detecting a second indicator, such as a predetermined user body and/or facial gesture, a predetermined audible code and/or a predetermined input to the apparatus.

Thus, present embodiments of the invention provide for a security feature within an apparatus that includes a fingerprint scanner used for purposes of authentication. Specifically, the invention detects a first indicator that is a user input to a fingerprint scanner and indicates the occurrence of a duress-inducing event. In response to detecting the first indicator, the present invention controls at least one of (i) access to the apparatus, and (ii) access to functionality provided by the apparatus. As such, if the user is being forced to input their fingerprint by a nefarious entity desiring access to the apparatus, the present invention provides a means by which the user can covertly activate certain features on the apparatus that prevent the nefarious entity from access to the apparatus and/or functionality provided by the apparatus Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. An apparatus for access and/or functionality security, the apparatus comprising:

a computing platform including a memory that stores an authentication fingerprint feature data set of a user, one or more computing processor devices in communication with the memory, a fingerprint scanner in communication with at least one of the one or more computing processor devices, and a fingerprint indicator detection and response application stored in the memory, executable by at least one of the one or more computing processor devices and configured to:

while the fingerprint scanner is scanning the fingerprint of a user, detect a first indicator that is a user input to the fingerprint scanner and is prompted by the user experiencing a duress-inducing event, and in response to detecting the first indicator, (i) control access to the apparatus, (ii) control access to functionality provided by the apparatus, and (iii) activate at least one of the one or more audio and/or video recording devices to covertly capture audio and/or video of the user, wherein controlling access to functionality further comprises presenting a fake user interface, wherein the fake user interface comprises icons for mock applications that appear as though they are real, but are inaccessible.

2. The apparatus of claim 1, wherein the fingerprint scanner is configured to sense an amount of pressure applied by the user while scanning the fingerprint and wherein detecting the first indicator is the determining that the user is applying an amount of pressure at the fingerprint scanner in excess of a predetermined pressure amount threshold.

3. The apparatus of claim 1, wherein the memory further stores a duress fingerprint feature data set and wherein detecting the first indicator is determining a match between a scanned fingerprint of the user and the duress fingerprint feature data set.

4. The apparatus of claim 1, wherein detecting the first indicator is determining that the user is applying a pattern of movement of one or more fingers at the fingerprint scanner that meets a predetermined movement pattern.

5. The apparatus of claim 1, wherein the fingerprint indicator detection and response application is further configured to control access to the apparatus by performing one of (i) powering down the apparatus, (ii) moving the apparatus to a locked state, (iii) preventing the apparatus from moving to an unlocked state, or (iv) requiring the user to submit further authentication credentials to move the apparatus to an unlocked state.

6. The apparatus of claim 1, wherein the apparatus comprises a mobile communication device and wherein the fingerprint indicator detection and response application is further configured to control access to the mobile communication device by presenting one or more alternative user interfaces on a display of the apparatus, wherein the alternative user interfaces display icons for one or more inaccessible mock applications.

7. The apparatus of claim 1, wherein the apparatus comprises a mobile communication device and the memory further stores one or more applications that store or provide access to user data and wherein the fingerprint indicator detection and response application is further configured to control access to functionality provided by the apparatus by performing one of (i) closing the applications, (ii) preventing access to the applications, (iii) removing or preventing access to the user data, or (iv) requiring the user to submit further authentication credentials to access the applications or the user data.

8. The apparatus of claim 1, wherein the fingerprint indicator detection and response application is further configured to generate and initiate wireless communication of an alert to one or more of (i) one or more financial institutions associated with the user, and (ii) a public safety entity.

9. The apparatus of claim 1, wherein the computing platform further comprises one or more audio and/or video recording devices that are in communication with at least one of the one or more computing device processors and wherein the apparatus further comprises an audio and/or video indicator detection and response application stored in the memory, executable by at least one of the one or more computing device processors and configured to detect a second indicator that is prompted by the user experiencing the duress-inducing event, wherein the second indicator includes one of (i) an audible code spoken by the user, or (ii) a body or facial gesture performed by the user.

10. A computer-implemented method for computing apparatus access and/or functionality security, the computer-implemented method is executed by one or more computing processor devices and comprises:

while a fingerprint scanner disposed on a computing apparatus is scanning a fingerprint of a user, detecting a first indicator that is a user input to the fingerprint scanner and prompted by the user experiencing a duress-inducing event; and in response to detecting the first indicator, (i) controlling access to the apparatus, (ii) controlling access to functionality provided by the apparatus, and (iii) activating at least one of the one or more audio and/or video recording devices to covertly capture audio and/or video of the user, wherein controlling access to functionality further comprises presenting a fake user interface, wherein the fake user interface comprises icons for mock applications that appear as though they are real, but are inaccessible.

11. The computer-implemented method of claim 10, wherein detecting the first indicator further comprises determining that the user is applying an amount of pressure at the fingerprint scanner in excess of a predetermined pressure amount threshold.

12. The computer-implemented method of claim 10, wherein detecting the first indicator further comprises determining that a match exists between a scanned fingerprint of the user and a stored duress fingerprint feature data set.

13. The computer-implemented method of claim 10, wherein detecting the first indicator further comprises determining that the user is applying a pattern of movement of one or more fingers at the fingerprint scanner that meets a predetermined movement pattern.

14. The computer-implemented method of claim 10, wherein controlling access to the apparatus further comprises one of (i) powering down the apparatus, (ii) moving the apparatus to a locked state, (iii) preventing the apparatus from moving to an unlocked state, or (iv) requiring the user to submit further authentication credentials to move the apparatus to an unlocked state.

15. The computer-implemented method of claim 10, wherein controlling access to functionality provided by the apparatus further comprises one of (i) closing applications stored on or accessible to the computing apparatus, (ii) preventing access to the applications, (iii) removing or preventing access to user data stored within or accessible to the applications, or (iv) requiring the user to submit further authentication credentials to access the applications or the user data.

16. A computer program product comprising:

a non-transitory computer-readable medium comprising sets of codes for causing one or more computing processing devices to:

while a fingerprint scanner disposed on a computing apparatus is scanning a fingerprint of a user, detect a first indicator that is a user input to the fingerprint scanner and prompted by the user experiencing a duress-inducing event; and in response to detecting the first indicator, (i) control access to the apparatus, (ii) control access to functionality provided by the apparatus, and (iii) activate at least one of the one or more audio and/or video recording devices to covertly capture audio and/or video of the user, wherein controlling access to functionality further comprises presenting a fake user interface, wherein the fake user interface comprises icons for mock applications that appear as though they are real, but are inaccessible.

17. The computer program product of claim 16, wherein the sets of codes for causing the one or more computing processor devices to detect the first indicator further comprise codes for causing the one or more computing processor devices to (i) determine that the user is applying an amount of pressure at the fingerprint scanner in excess of a predetermined pressure amount threshold, (ii) determine that the user is applying a pattern of movement of one or more fingers at the fingerprint scanner that meets a predetermined movement pattern, or (iii) determine a match between a scanned fingerprint of the user and a duress fingerprint feature data set.

18. The computer program product of claim 16, wherein the set of codes for causing the one or more computing processing devices to control access to the apparatus further comprise codes for causing the one or more computing processor devices to (i) power down the apparatus, (ii) move the apparatus to a locked state, (iii) prevent the apparatus from moving to an unlocked state, or (iv) require the user to submit further authentication credentials to move the apparatus to an unlocked state.

19. The computer program product of claim 16, wherein the set of codes for causing the one or more computing processing devices to control access to functionality provided by the apparatus further comprise codes for causing the one or more computing processor devices to one of (i) close applications stored on or accessible to the computing apparatus, (ii) prevent access to the applications, (iii) remove or preventing access to user data stored within or accessible to the applications, or (iv) require the user to submit further authentication credentials to access the applications or the user data.

* * * * *